J. HOLLIS.
LAMP BRACKET.
APPLICATION FILED NOV. 30, 1918.
1,319,393.
Patented Oct. 21, 1919.
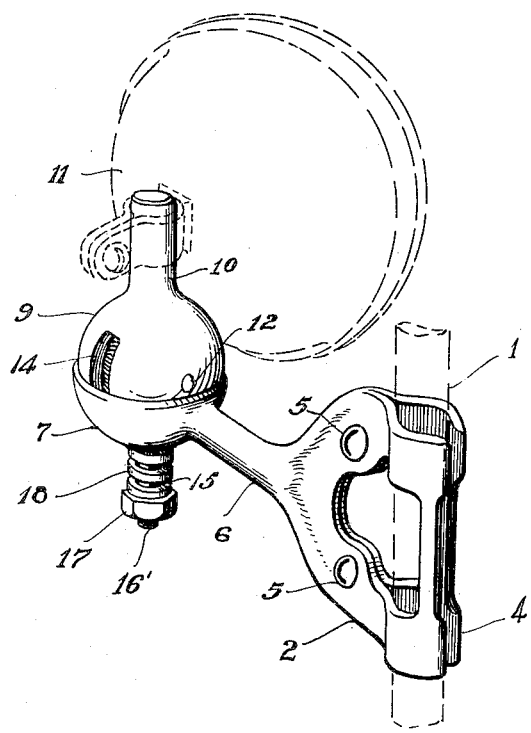
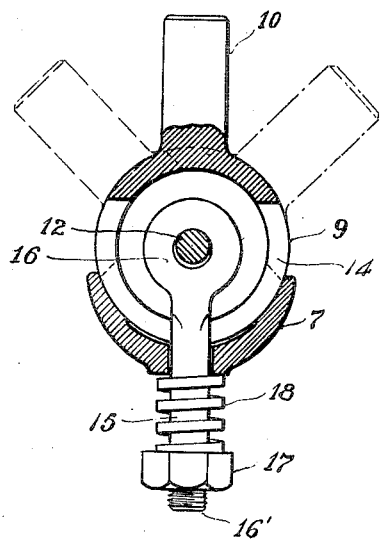
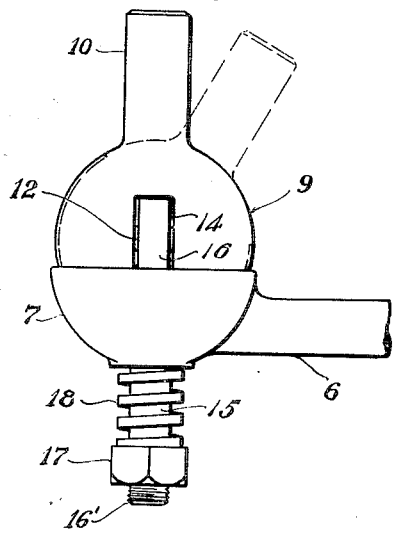
INVENTOR,
Joseph Hollis,
By Frease, Merkel, Saywell and Bond
ATTORNEYS.

UNITED STATES PATENT OFFICE.

JOSEPH HOLLIS, OF CANTON, OHIO, ASSIGNOR TO JOHN E. McLAIN, OF MASSILLON, OHIO.

LAMP-BRACKET.

1,319,393.  Specification of Letters Patent.  Patented Oct. 21, 1919.

Application filed November 30, 1918. Serial No. 264,763.

*To all whom it may concern:*

Be it known that I, JOSEPH HOLLIS, a citizen of the United States, residing at Canton, in the county of Stark and State of Ohio, have invented a new and useful Lamp-Bracket, of which the following is a specification.

This invention relates to lamp brackets and more particularly to brackets designed to carry spot lights upon automobiles or the like, the object being to construct a bracket that will permit the rays from the spot light to be directed in any direction.

Another object is to construct a bracket with which the lamp may be quickly and easily adjusted in any desired position without the necessity of loosening screws, bolts, wing nuts or the like.

Another object is to construct a bracket with an adjustable joint which, while readily adjustable, will always hold the lamp in the position into which it was adjusted.

Another object is to provide means for compensating for any wear which will take place in the joint due to the constant use thereof.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawings:

Figure 1 is a perspective view of my improved bracket with the wind shield frame and spot light shown in dotted lines.

Fig. 2 is a cross section through the joint of my bracket and

Fig. 3 is a side elevation of the joint.

Similar numerals of reference indicate corresponding parts throughout the several figures of the drawings.

At 1 I have indicated in dotted lines the wind shield standard of an automobile to which standard is secured a pair of jaws 2 and 4. One of these jaws is made removable in the ordinary manner to permit adjustment to any dimension of wind shield standard, ordinary screws 5 being employed to tighten the jaws in position upon the said standard. Formed integral with the jaw 2 is an outwardly extending arm 6, the extremity of which is shaped to form a semi-spherical hollow cup 7, through the bottom center of which extends an aperture 8. Fitting within the cup 7 is a hollow ball 9, which ball has an upwardly projecting stud 10 to which is designed to be secured a spot light 11. A rounded pin 12 extends diametrically through the hollow ball 9 at the center thereof and is securely fastened in the opposite sides of the said ball. A circumferential slot 14 is formed in the ball 9 and extends substantially two-thirds of the distance around the said ball at a point exactly intermediate the ends of the pin 12. A bolt 15 which extends through the aperture 8 in the cup 7 has a flattened upper portion in which is formed an eye 16, the pin 12 passing through the said eye as clearly shown in Fig. 2. The lower end of the bolt 15 is threaded as shown at 16' to receive a nut 17 and between the said nut and the bottom face of the cup 7 is interposed a coiled spring 18.

In assembling my device the eye 16 is inserted through the slot in the ball and the pin 12 secured in place through the said eye. The bottom portion of the bolt 15 is then passed through the aperture 8 in the cup 7 and the spring 18 slipped upon the extending lower end of the bolt. The nut 17 is then threaded upon the lower end of the bolt and screwed upwardly until a considerable tension is exerted upon the spring 18. The tensioning of the spring 18 will cause the outer face of the ball 9 to be pressed firmly against the inner face of the cup 7, and while this pressure is sufficient to prevent accidental relative movement between the ball and the cup, it is possible to move the ball to the dotted line and dot and dash line positions shown in Fig. 2. It is obvious that the slot 14 will permit the ball to be swung into either direction until the stud 10 contacts with the upper rim of the cup 7. If it is desired to tilt the lamp in a direction angular to the direction of the slot 14 it is only necessary to rotate the ball 9 to the angle desired at which point the ball is once more free to swing; in other words any possible angle of adjustment may be obtained by pivoting the ball upon the bolt 15 and the pin 12. The lamp itself will of course be grasped by the operator when it is desired to focus the beam of light, a sufficient leverage, thereby being obtained to move the ball 9 freely in any direction, the spring 18 however exerting sufficient tension to preclude accidental displacement of the light through jarring when it has once been adjusted to the proper focus.

Having fully described my invention what I claim as new and desire to secure by Letters Patent, is:

1. In a lamp bracket of the character described, a semi-spherical cup, a bolt extending vertically through said cup at the center thereof, an eye formed upon the upper extremity of said bolt, a hollow ball fitting about said eye, a pin extending diametrically and centrally through said ball and through said eye, a slot formed in said ball to permit pivotal movement of said ball upon said pin, a coiled spring and a nut upon the said bolt coöperating to secure the said hollow ball movably within the said cup.

2. In a lamp bracket of the character described, a semi-spherical cup, a bolt extending vertically through said cup at the center thereof, an eye formed upon the upper extremity of said bolt, a hollow ball fitting about said eye, a pin extending diametrically through said ball and through said eye, said ball provided with a slot to permit pivotal movement of the ball upon the pin and means yieldingly securing the bolt for rotation within the cup.

3. In a lamp bracket of the character described, a semi-spherical cup, a bolt yieldingly secured for rotation within said cup, an eye formed upon the upper extremity of said bolt, a hollow ball fitting about said eye and a pin extending centrally and diametrically through said ball and through said eye, said ball provided with a slot to permit pivotal movement of the ball upon the pin.

In testimony that I claim the above, I have hereunto subscribed my name.

JOSEPH HOLLIS.